US011044089B2

(12) United States Patent
Truchan et al.

(10) Patent No.: US 11,044,089 B2
(45) Date of Patent: Jun. 22, 2021

(54) SECURITY CONTEXT ESCROWING

(71) Applicants: Telefonaktiebolaget LM Ericsson (publ), Stockholm (SE); Catherine Truchan, Lorraine (CA); Stere Preda, Longueuil (CA); Suresh Krishnan, Suwanee, GA (US)

(72) Inventors: Catherine Truchan, Lorraine (CA); Stere Preda, Longueuil (CA); Suresh Krishnan, Suwanee, GA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 2 days.

(21) Appl. No.: 16/095,072

(22) PCT Filed: May 5, 2016

(86) PCT No.: PCT/US2016/031053
§ 371 (c)(1),
(2) Date: Oct. 19, 2018

(87) PCT Pub. No.: WO2017/192143
PCT Pub. Date: Nov. 9, 2017

(65) Prior Publication Data
US 2019/0116031 A1    Apr. 18, 2019

(51) Int. Cl.
*H04L 29/06* (2006.01)
*H04L 9/08* (2006.01)
(Continued)

(52) U.S. Cl.
CPC ............ *H04L 9/0894* (2013.01); *H04L 9/083* (2013.01); *H04L 9/0891* (2013.01);
(Continued)

(58) Field of Classification Search
CPC ..... H04L 9/0894; H04L 9/083; H04L 63/029; H04L 9/0891; H04W 12/04031; H04W 36/0036; H04W 36/12; H04W 4/70
(Continued)

(56) References Cited

U.S. PATENT DOCUMENTS 8,023,658 B2    9/2011  Yang et al.
2008/0240439 A1  10/2008 Mukherjee et al.
(Continued)

FOREIGN PATENT DOCUMENTS

WO      2015084559 A1     6/2015
WO      2016006969 A1     1/2016
WO      WO-2016006969 A1 * 1/2016  ........ H04W 36/0094

OTHER PUBLICATIONS

Author Unknown, "Technical Specification Group Services and System Aspects; Study on Machine-Type Communications (MTC) and other mobile data applications communications enhancements (Release 12)," Technical Report 23.887, Version 12.0.0, 3GPP Organizational Partners, Dec. 2013, 151 pages.
(Continued)

*Primary Examiner* — Evans Desrosiers
(74) *Attorney, Agent, or Firm* — Withrow & Terranova, PLLC

(57) ABSTRACT

Methods, systems, and computer program products for security context escrowing are provided herein. According to one aspect, a method of operation of a network node for a telecommunications network comprises storing security context information associated with a small data, fast path connection between a wireless device and a first gateway that is serving the wireless device, determining a change in the gateway that is serving the wireless device from the first gateway to a second gateway, and, in response to determining the change, providing the stored security context infor-
(Continued)

mation to the second gateway for use with the wireless device.

18 Claims, 7 Drawing Sheets

(51) Int. Cl.
*H04W 36/00* (2009.01)
*H04W 36/12* (2009.01)
*H04W 12/0431* (2021.01)
*H04W 4/70* (2018.01)

(52) U.S. Cl.
CPC ............ *H04L 63/029* (2013.01); *H04L 63/06* (2013.01); *H04L 63/20* (2013.01); *H04W 12/0431* (2021.01); *H04W 36/0033* (2013.01); *H04W 36/0038* (2013.01); *H04W 36/0055* (2013.01); *H04W 36/12* (2013.01); *H04W 4/70* (2018.02)

(58) Field of Classification Search
USPC .......................................................... 380/286
See application file for complete search history.

(56) References Cited

U.S. PATENT DOCUMENTS

| 2010/0173610 | A1 | 7/2010 | Kitazoe et al. |
| 2011/0080875 | A1* | 4/2011 | Yang ..................... H04L 9/0844 370/328 |
| 2011/0222690 | A1 | 9/2011 | Gan |

OTHER PUBLICATIONS

Author Unknown, "Technical Specification Group Radio Access Network; Advanced Wireless Services (AWS) extension band for LTE (Release 13)," Technical Report 36.869, Version 13.0.0, 3GPP Organizational Partners, Jan. 2016, 30 pages.

Author Unknown, "Technical Specification Group Radio Access Network; Study on provision of low-cost Machine-Type Communications (MTC) User Equipments (UEs) based on LTE (Release 12)," Technical Report 36.888, Version 12.0.0, 3GPP Organizational Partners, Jun. 2013, 55 pages.

Author Unknown, "Technical Specification Group Radio Access Network; Study on Enhancements to Machine-Type Communications (MTC) and other Mobile Data Applications; Radio Access Network (RAN) aspects (Release 12)," Technical Report 37.869, Version 12.0.0, 3GPP Organizational Partners, Sep. 2013, 43 pages.

Author Unknown, "Technical Specification Group Services and System Aspects; 3G Security; Security architecture (Release 13)," Technical Specification 33.102, Version 13.0.0, 3GPP Organizational Partners, Jan. 2016, 76 pages.

Author Unknown, "Technical Specification Group Services and System Aspects; 3GPP System Architecture Evolution (SAE); Security architecture (Release 13)," Technical Specification 33.401, Version 13.2.0, 3GPP Organizational Partners, Mar. 2016, 146 pages.

Author Unknown, "Technical Specification Group Radio Access Network; Evolved Universal Terrestrial Radio Access (E-UTRA); Packet Data Convergence Protocol (PDCP) specification (Release 12)," Technical Specification 36.323, Version 12.5.0, 3GPP Organizational Partners, Dec. 2015, 33 pages.

Author Unknown, "Technical Specification Group Radio Access Network; Evolved Universal Terrestrial Radio Access Network (E-UTRAN); X2 application protocol (X2AP) (Release 13)," Technical Specification 36.423, Version 13.3.0, 3GPP Organizational Partners, Mar. 2016, 230 pages.

Denning, Dorothy E., et al., "A Taxonomy for Key Escrow Encryption Systems," Communications of the ACM, vol. 39, Issue 3, Mar. 1996, New York, pp. 34-40.

International Search Report and Written Opinion for International Patent Application No. PCT/US2016/031053, dated Sep. 13, 2016, 11 pages.

Examination Report for European Patent Application No. 16725970. 4, dated Jun. 12, 2020, 5 pages.

Examination Report for Indian Patent Application No. 201837044924, dated Aug. 11, 2020, 6 pages.

\* cited by examiner

SECURITY CONTEXT ESCROWING

This application is a 35 U.S.C. § 371 national phase filing of International Application No. PCT/US2016/031053, filed May 5, 2016, the disclosure of which is incorporated herein by reference in its entirety.

TECHNICAL FIELD

The present disclosure relates to Machine Type Communication (MTC) and more particularly relates to security context escrowing for Small Data, Fast Path (SDFP) communications.

BACKGROUND

With the advent of the Internet of Things (IoT), large numbers of autonomous devices (e.g., devices that operate without human input) are communicating wirelessly with the Internet. Communication between these autonomous devices was formerly referred to as "machine to machine," or "M2M" communication, and is now known as "machine type communication," or "MTC," Such a device is herein referred to as "an MTC device." Since many MTC devices can communicate via cellular networks in addition to wireless Internet Protocol (IP), Wi-Fi, and so on, this can result in dense User Equipment (UE) deployment within a cell. This creates new challenges as network operators attempt to deal with this increasing density of devices and the increasingly larger demands for limited resources. Network equipment vendors continually work to establish viable solutions to guarantee ubiquitous and permanently evolving connectivity among devices from all types of environments. Intrinsic values of these solutions are resource optimization and efficiency, extensibility and scalability, and cost efficiency. Sustaining highly dense UE deployments is a natural outcome of such solutions.

One approach to the problems of high-density UE deployment is an optimization referred to as the Small Data, Fast Path (SDFP) Radio Access Network (RAN) optimization, which may also be referred to herein as "the SDFP RAN optimization" or simply "the SDFP optimization." The SDFP optimization is described in detail in Third Generation Partnership Project (3GPP) Technical Report (TR) 23.887. The SDFP optimization is suitable for MTC devices known to be exchanging small data. It implies a reduced amount of signaling required for the UE to acquire the connected state from the idle one.

FIG. 1 is a network signaling diagram that illustrates the reduced signaling burden during a UE's transition from an idle state to a connected state as provided under the SDFP optimization. FIG. 1 illustrates the 3GPP sequence flow (TR 23.887) for this scheme, showing the interaction between an Evolved Node B ("eNodeB" or "eNB") 10, a UE 12 that is being served by the eNB 10, a Serving Gateway (SGW) 14, and a Packet Gateway (PGW) 16. In the embodiment illustrated in FIG. 1, the SGW 14 and the PGW 16 are already communicating via a S5/S8 tunnel 100. The UE 12 sends to the eNB 10 a random access preamble (message 102), and the eNB 10 responds to the UE 12 with a random access response (message 104). The UE 12 sends to the eNB 10 a Radio Resource Control (RRC) Connection Request (message 106), which includes a System Architecture Evolution (SAE) Temporary Mobile Subscriber Identity (S-TMSI), and a small data indicator. The eNB 10 responds by sending to the UE 12 a RRC Connection Setup (message 108). The UE 12 responds by sending to the eNB 10 an RRC Connection Setup Complete (message 110). In this manner, a Data Radio Bearer (DRB) channel 112 is established between the eNB 10 and the UE 12.

The UE 12 then sends to the eNB 10 an IP packet and SGW Bearer Resource Identifier (ID) (message 114). The eNB 10 establishes an S1 Tunnel 116 to the SGW 14 over the identified SGW bearer resource. In the example illustrated in FIG. 1, the eNB 10 sends a General Packet Radio Service (GPRS) Tunneling Protocol—User plane (GTP-U) message 118 to SGW 14 via the S1 Tunnel 116. The GTP-U message 118 includes an IP packet and a Fully Qualified Tunnel Endpoint Identifier (F-TEID). The SGW 14 sends a GTP-U IP Packet (message 120) to the PGW 16 via the S5/S8 Tunnel 100. The PGW 16, which forwards the message as an IP packet (message 122) to its destination.

In the example illustrated in FIG. 1, the PGW 16 receives an IP response packet (message 124), which is sent via the S5/S8 Tunnel 100 to the SGW 14 as a GTP-U message 126. The SGW 14 forwards the packet via the S1 Tunnel 116 to the eNB 10 as GTP-U message 128. The eNB 10 sends the IP Response Packet to the UE 12 (message 130).

In the embodiment illustrated in FIG. 1, the eNB 10 uses a Frame Protocol (FP) inactivity timer 132; at time-out, the SDFP information is removed, the S1 Tunnel 116 is dismantled, and the RRC connection is released. The SGW 14 also uses a FP inactivity timer 134; at time-out, the SDFP session is inactive but still in an enabled state, and the S1 Tunnel 116 is removed. Once the SDFP communication times out, the eNB 10 issues an RRC Connection Release (message 136) to the UE 12.

In contrast to legacy transmissions that involve significant signaling whenever a UE transits from an idle state to a connected state, the SDFP protocol described in FIG. 1 does not require any signaling between the UE 12 and a Mobility Management Entity (MME).

FIG. 2 is a network signaling diagram that illustrates another aspect of communications using the SDFP optimization. FIG. 2, which substantially duplicates FIG. 5.1.1.3.6.2-1 of 3GPP TR 23.887, details specifics about the bearer path that is established between an MTC device (UE 12), the eNB 10, the SGW 14, the PGW 16, and a Packet Data Network (PDN) 18. In the embodiment illustrated in FIG. 2, the bearer path includes the following segments: the Long Term Evolution (LTE) air interface "UU" 140 between the UE 12 and the eNB 10; the S1-U GTP-U tunnel 142 between the eNB 10 and the SGW 14; the S5/S8 GTP-U tunnel 144 between the SGW 14 and the PGW 16; and IP traffic 146 between the PGW 16 and the PDN 18. It should be noted that there is an encrypted data path from the UE 12 to the SGW 14, and that this data path goes through the eNB 10.

SDFP implements a "Packet Data Convergence Protocol (PDCP)-like" protocol between a UE and a SGW. The transmission scheme in FIG. 1 is possible as a result of a security context shared between the UE 12 and the SGW 14. The definition of a security context is given in 3GPP Technical Specification TS 33.401. The security context is viewed as a local state at the UE 12 and the network domain (here, SGW 14), which is established after an initial phase of UE and network mutual authentication.

The security context takes the form of a small set of locally stored cryptographic parameters. Among those parameters, a secret user plane encryption key $K_{UPenc}$ is computed by both the UE 12 and SGW 14 at the end of the authentication phase and serves as input to derive the keystreams that are actually used to encrypt and decrypt the small data (Eq. 1). Robust Header Compression (ROHC), an optional component of the PDCP protocol, is turned off. For the uplink, the UE 12 appends SGW Bearer Resource ID information to the PDCP encrypted small data Packet Data Unit (PDU) allowing the eNB 10 to choose the right GTP-U tunnel on which to simply forward the encrypted small data.

A PDCP-like protocol with an encryption scheme similar to the one in TS 33.401 considers systematically deriving a different keystream for every new PDCP PDU based on the following parameters: the initially shared $K_{UPenc}$ unique key, the volume of the UE-SGW exchanged data (the so-called COUNT value), bearer ID, and direction (uplink, downlink). Thus, the keystream used to encrypt and decrypt a given small data PDU is individually computed as a function by both the UE and SGW as following:

$$K_{stream}=\text{func}(K_{UPenc}, \text{direction, bearerID, size, COUNT, enc\_algo}) \quad \text{Eq. 1}$$

with the COUNT value depending on the sequence number carried in the PDCP PDU, size representing the length of the keystream required (e.g., the PDCP PDU payload size) and the enc_algo representing the negotiated encryption algorithm (e.g., Advanced Encryption Standards (AES)). A trusted entity is thus able to compute $K_{stream}$ based on these parameters, without actually having to receive the full PDCP small data PDU.

The SDFP optimization enables the UE to exchange user plane data (send or receive) without much of the 3GPP legacy control plane signaling necessary to establish the user plane, a portion of which is shown in FIG. 3, which illustrates the UE/network authentication procedure. This solution reduces the number of RRC messages and involves no signaling between the UE and the Mobility Management Entity (MME), known as S1 signaling. This optimization benefits MTC devices, because it lowers the processing and signaling overhead, which can reduce power demands and increase battery life as well as reduce device complexity, size, and cost.

In accordance with SDFP, whenever the UE 12 has to transit from the idle to connected state, the RRC connection is established and the data plane is turned on directly between the UE 12 and the SGW 14 based on an existing UE/SGW shared context. This context includes a secret encryption key which is re-used as long as the UE 12 is anchored to the same SGW 14. The small data fast path RAN optimization is suitable for MTC devices known to be sending or receiving small data.

However, any scenario leading to SGW relocation (e.g., as a result of SGW handover, or as a result of maintenance operations) implies an explicit UE negotiation with the new SGW for a new security context and a new key. For the particular case of SGW relocation as a result of UE mobility or bringing the SGW 14 out for maintenance, additional bearer signaling to the UE 12 is required to update the UE security context with the new SGW. This UE/SGW security context renegotiation does not constitute seamless gateway relocation from the perspective of the UE 12. More specifically, if the SGW 14 is relocated as a result of UE handover or SGW maintenance operations, the MME triggers re-keying, i.e., a procedure that results in a new $K_{UPenc}$ computed by the UE 12 and the SGW 14 and, consequently, new $K_{stream}$ keystreams. The procedure to obtain a new $K_{UPenc}$ is similar to the standard one for the UE-eNB Access Stratum security setup, which is accompanied by a significant over-the-air signaling to the UE, which may include the re-authentication steps shown in FIG. 3.

FIG. 3 is a network signaling diagram that illustrates the signaling overhead triggered by a change of SGW even under the SDFP optimization. In the embodiment illustrated in FIG. 3, the re-authentication process includes sending, by a MME 28, an authentication information request (message 200) to a Home Subscriber Server (HSS) 22. The authentication information request includes the International Mobile Subscriber Identity (IMSI) associated with the UE 12. The HSS 24 responds with an Authentication Information Answer (message 202), which includes an authentication vector.

Once the UE 12 is authenticated, the MME 20 begins a series of Non-Access-Stratum (NAS) message interactions with the UE 12. In the example illustrated in FIG. 3, the MME 20 sends an RRC downlink information transfer/NAS authentication request (messages 204 and 206), and the UE 12 responds with an RRC uplink information transfer/NAS authentication response (messages 208 and 210). The MME 20 then sends an RRC downlink information transfer/NAS security mode command (messages 212 and 214), and the UE 12 responds with an RRC uplink information transfer/NAS security mode complete (messages 216 and 218). When the UE first attaches to the operator's network, the MME 20 sends to an Equipment Identity Register (EIR) 24 a mobile equipment identity check request on the International Mobile Equipment Identity (IMEI) value associated with the UE (message 220), and the EIR 24 responds by sending to the MME 20 a mobile equipment identity check answer (message 222). After the first attachment, this interaction with the EIR 24 is not repeated. This is indicated by the use of dotted lines to represent messages 220 and 222 as conditional.

For MTC devices, this represents a significant load of control plane radio signaling. Moreover, the radio resources are known to be scarce in the MTC world, especially for highly dense deployments. Such signaling should be reduced if not completely eliminated.

SUMMARY

According to one aspect of the subject matter described herein, a method of operation of a network node for a telecommunications network comprises storing security context information associated with a Small Data, Fast Path (SDFP) connection between a wireless device and a first gateway that is serving the wireless device, determining a change in the gateway that is serving the wireless device from the first gateway to a second gateway, and providing, in response to determining the change, the stored security context information to the second gateway for use with the wireless device.

In one embodiment, the network node comprises a Mobility Management Entity (MME). In one embodiment, the security context information comprises at least one of: a user plane encryption key ($K_{UPenc}$): information indicating a direction of transmission; information identifying a bearer; information indicating a transmission size; information indicating a transmission count; and information identifying an encryption algorithm. In one embodiment, the SDFP connection is through a base station. In one embodiment, prior to the change, the security context information is associated with a first tunnel from the wireless device to the first gateway via the base station and wherein, subsequent to the change, the security context information is associated with a second tunnel from the wireless device to the second gateway via the base station. In one embodiment, the base station comprises an Evolved Node B (eNB). In one embodiment, in response to determining the change, the network node instructs the base station to remap information used by the base station to identify the first gateway to instead identify the second gateway. In one embodiment, the information used to identify the first gateway comprises a gateway bearer resource identifier.

In one embodiment, the method further comprises receiving, from a sender, an update for at least some of the security context information, and using the received security context information to update the security context information stored at the network node, wherein the sender comprises at least one of the first gateway or the second gateway. In one embodiment, receiving the update comprises receiving at least one of: a user plane encryption key, $K_{UPenc}$; information indicating a direction of transmission; information identifying a bearer; information indicating a transmission size, information indicating a transmission count; and information identifying an encryption algorithm. In one embodiment, the update is received in response to a triggering event. In one embodiment, the triggering event comprises receiving, by the sender, a command to provide the update. In one embodiment, the command was sent by the network node. In one embodiment, the triggering event comprises computation of the user plane encryption key ($K_{UPenc}$) by the sender. In one embodiment, the triggering event comprises a change of the sender's connection state. In one embodiment, the triggering event comprises a change of at least a portion of the security context information. In one embodiment, the triggering event comprises expiry of a timer or passage of a defined duration of time. In one embodiment, the triggering event comprises completion of transmission of data to or from the sender.

According to another aspect of the subject matter described herein, a network node for a telecommunications network comprises a network interface for communicating with a telecommunications network, one or more processors, and memory. The memory stores instructions executable by the one or more processors, whereby the network node is operable to store information associated with a security context between a wireless device and a first gateway that is serving the wireless device, determine a change in the gateway that is serving the wireless device from the first gateway to a second gateway, and provide, in response to determining the change, the stored security context to the second gateway for use with the wireless device.

In one embodiment, the network node comprises a MME. In one embodiment, the information associated with the security context comprises at least one of: a user plane encryption key ($K_{UPenc}$); information indicating a direction of transmission; information identifying a bearer; information indicating a transmission size; information indicating a transmission count; and information identifying an encryption algorithm. In one embodiment, the stored information is associated with a security context that, prior to the change, is associated with a tunnel from the wireless device to the first gateway via a base station and that, subsequent to the change, is associated with a tunnel from the wireless device to the second gateway via the base station.

In one embodiment, via execution of the instructions by the one or more processors, the network node is further operable to, in response to determining the change; instruct the base station to remap information used by the base station to identify the first gateway to instead identify the second gateway. In one embodiment, the information used to identify the first gateway comprises a gateway bearer resource identifier. In one embodiment, via execution of the instructions by the one or more processors, the network node is further operable to receive, from a sender, an update for at least some of the information associated with the security context, and use the received information to update the information that is stored at the network node and that is associated with the security context, wherein the sender comprises at least one of the first gateway and the second gateway.

In one embodiment, receiving the update comprises receiving at least one of: a user plane encryption key, $K_{UPenc}$; information indicating a direction of transmission; information identifying a bearer; information indicating a transmission size, information indicating a transmission count; and information identifying an encryption algorithm. In one embodiment, the update is received in response to a triggering event. In one embodiment, the triggering event comprises receiving, by a sender, a command to provide the update. In one embodiment, the command was sent by the network node. In one embodiment, the triggering event comprises computation of the user plane encryption key ($K_{UPenc}$), by the sender. In one embodiment, the triggering event comprises a change of the sender's connection state. In one embodiment, the triggering event comprises a change of at least a portion of the security context. In one embodiment, the triggering event comprises expiry of a timer or passage of a defined duration of time. In one embodiment, wherein the triggering event comprises completion of transmission of data to or from the sender.

According to another aspect of the subject matter described herein, a network node for a telecommunications network is adapted to store security context information associated with a SDFP connection between a wireless device and a first gateway that is serving the wireless device, determine a change in the gateway that is serving the wireless device from the first gateway to a second gateway, and provide, in response to determining the change, the stored security context information to the second gateway for use with the wireless device.

According to another aspect of the subject matter described herein, a network node for a telecommunications network comprises means for storing security context information associated with a SDFP connection between a wireless device and a first gateway that is serving the wireless device, means for determining a change in the gateway that is serving the wireless device from the first gateway to a second gateway, and means for providing, in response to determining the change, the stored security context information to the second gateway for use with the wireless device.

According to another aspect of the subject matter described herein, a network node for a telecommunications network comprises a storage module operable to store security context information associated with a SDFP connection between a wireless device and a first gateway that is serving the wireless device, a determining module operable to determine a change in the gateway that is serving the wireless device from the first gateway to a second gateway, and a providing module operable to provide, in response to determining the change, the stored security context information to the second gateway for use with the wireless device.

According to another aspect of the subject matter described herein, a non-transitory computer readable medium stores software instructions that, when executed by one or more processors of a network node for a telecommunications network, cause the network node to: store information associated with a security context between a wireless device and a first gateway that is serving the wireless device; determine a change in the gateway that is serving the wireless device from the first gateway to a second gateway; and provide, in response to determining the change, the stored security context to the second gateway for use with the wireless device.

According to another aspect of the subject matter described herein, a computer program comprise instructions, which, when executed by at least one processor, cause the at least one processor to carry out any of the methods described herein. In one embodiment, a carrier comprises the computer program, wherein the carrier is one of an electronic signal, and optical signal, a radio signal, or a computer readable storage medium.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
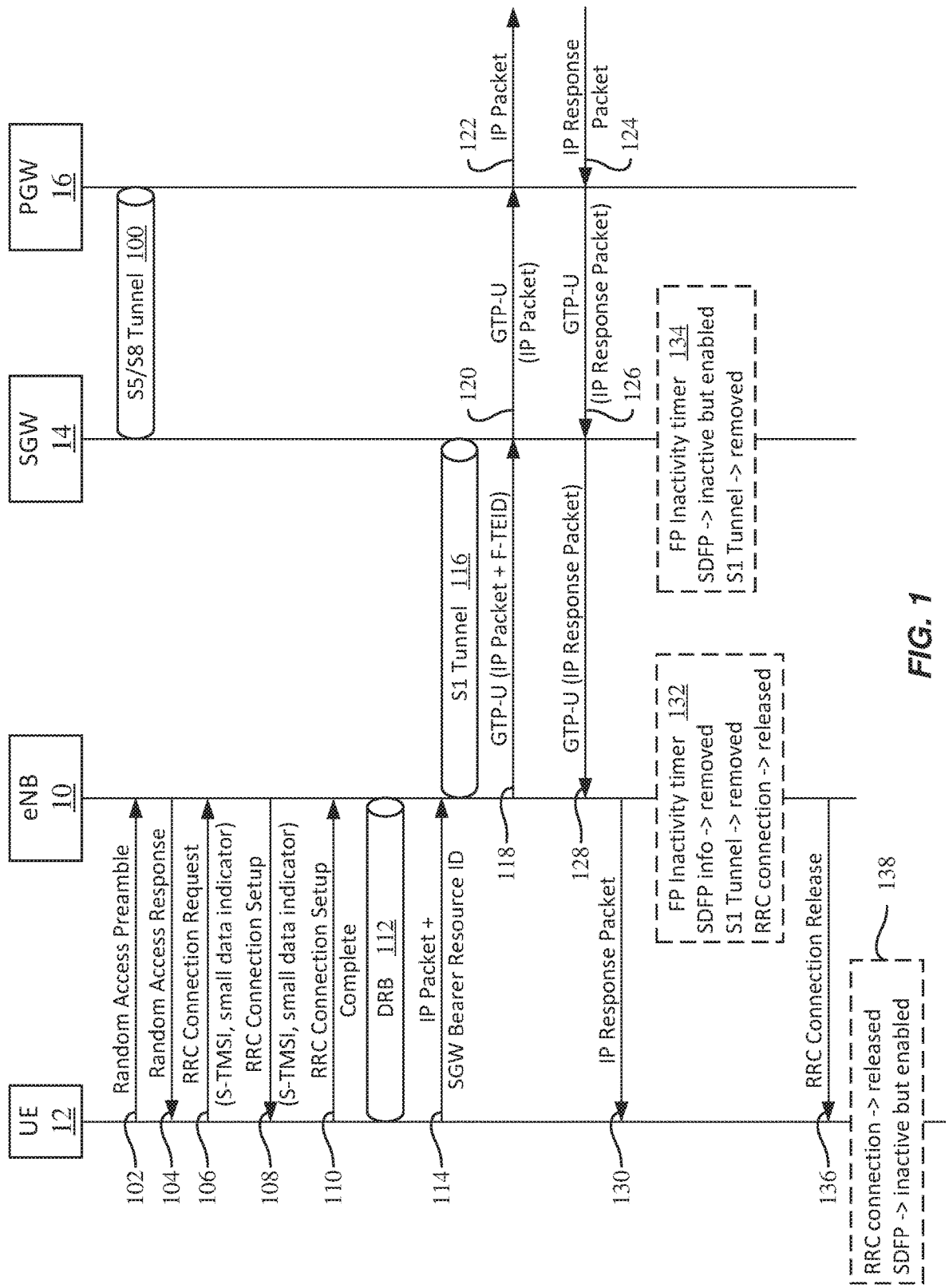
FIG. 1 is a network signaling diagram that illustrates the reduced signaling burden during a User Equipment's (UE's) transition from an idle state to a connected state as provided under the Small Data, Fast Path (SDFP) optimization.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Methods and systems for security context escrowing are presented herein. The techniques described herein eliminate signaling to a User Equipment (UE) whenever a Serving Gateway (SGW) is relocated for a Small Data, Fast Path (SDFP) Radio Access Network (RAN) optimization. In the embodiments described herein, the SGW together with a Mobility Management Entity (MME) implements a variant of key escrow system which ensures a UE security context backup capability in the network. According to one embodiment, a short or long life SGW-MME communication is established allowing the MME to recover the SDFP security context updates. The MME restores the UE's security context on the new SGW so that SGW relocation is perfectly seamless from the UE's perspective. The UE continues to use the security context previously shared with the old SGW and no signaling is performed with the UE. This solution benefits MTC deployments where radio resources are scarce and/or the MTC UE devices have to meet stringent power saving requirements. Furthermore, this solution does not add any extra signaling to the UE, which proves advantageous for MTC applications with limited RAN resources and devices with power saving constraints.

The Third Generation Partnership Project (3GPP) technical standards, particularly the 33 series and 3GPP Technical Specification (TS) 36.323 (i.e., Packet Data Convergence Protocol (PDCP)), standardize the key hierarchy and generation as well as their usage for the control and user planes. Under a current 3GPPproposal, every UE uses one secret key—$K_{UPenc}$—negotiated and shared with the SGW for the small data fast path RAN optimization, serving as a master key to derive the keystreams ($K_{stream}$) for each small data bearer and direction. In contrast, the subject matter described herein includes a mechanism that implements UE security context escrowing in the network, and one that is particularly beneficial for UEs, such as critical MTC UEs, that require seamless SGW relocation and/or have to meet power saving requirements.

For every UE, the security context consists of the set of parameters in Eq. 1 necessary to derive the $K_{stream}$ keys, which are used to encrypt and decrypt the small data. These parameters include $K_{UPenc}$, direction, bearerID, size, count, and enc_algo. As used herein, the term "Data Recovery Key (DRK)" may be used to refer to the uplink encryption key $K_{UPenc}$, and the term "Data Recovery Field (DRF)" may be used to refer to the other parameters (e.g., direction, bearerID, size, count, and enc_algo). The DRK is confidential, but the DRF is not.

The subject matter described herein can take advantage of some of the existing infrastructure. For example, the DRK is computed from a master key and stored on the MME already, which means that there is a low barrier to adoption of this technology to upgrade existing systems. Although these keys are usually shared only between the UEs and the SGW in the small data fast path RAN optimization, the MME can obtain or locally compute them through explicit signaling from the SGW during the UE-SGW key negotiation phase.

Figure 4:
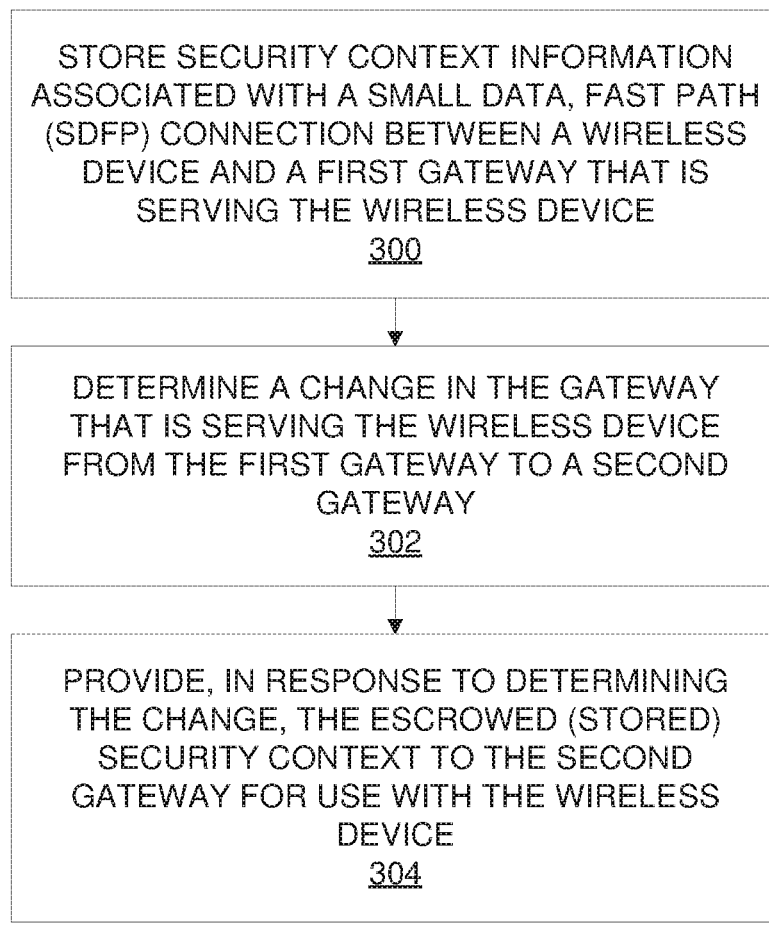
FIG. 4 is a flow chart illustrating an exemplary process for security context escrowing according to an embodiment of the subject matter described herein.

FIG. 4 is a flow chart illustrating an exemplary process for security context escrowing according to an embodiment of the subject matter described herein. In the embodiment illustrated in FIG. 4, the process includes storing security context information associated with an SDFP connection between a wireless device and a first gateway that is serving the wireless device (step 300). The process includes determining a change in the gateway that is serving the wireless device from a first gateway to a second gateway (step 302), and, in response, providing the escrowed (stored) security context to the second gateway for use with the wireless device (step 304).

Figure 2:
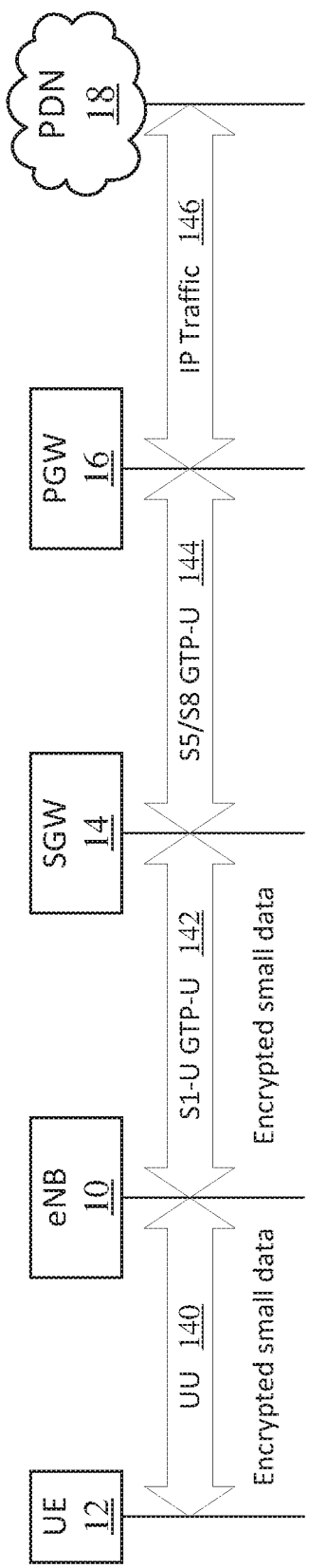
FIG. 2 is a network signaling diagram that illustrates another aspect of communications under the SDFP optimization.
Figure 3:
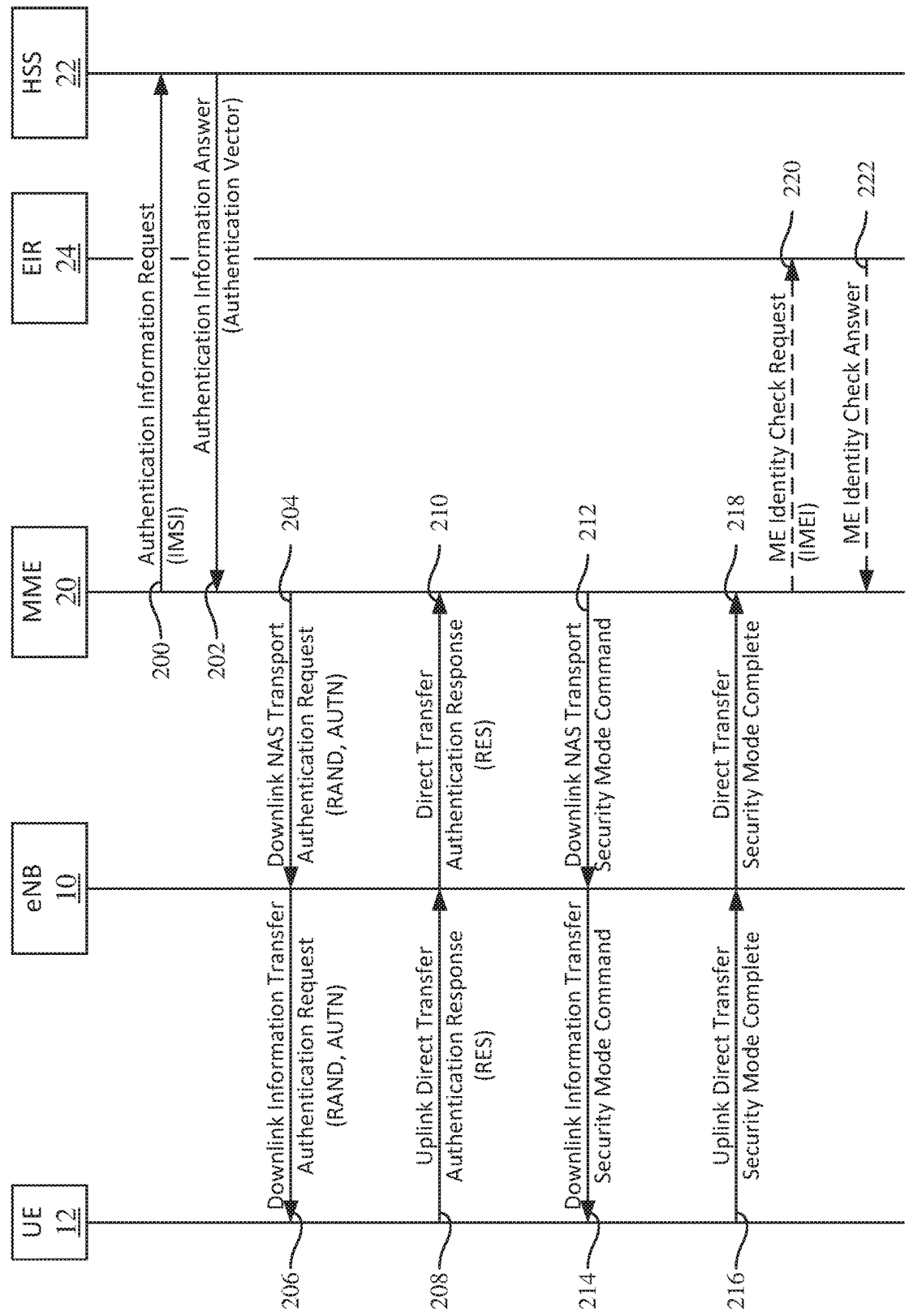
FIG. 3 is a network signaling diagram that illustrates the signaling overhead triggered by a change of Serving Gateway (SGW) even under the SDFP optimization.
Figure 5A:
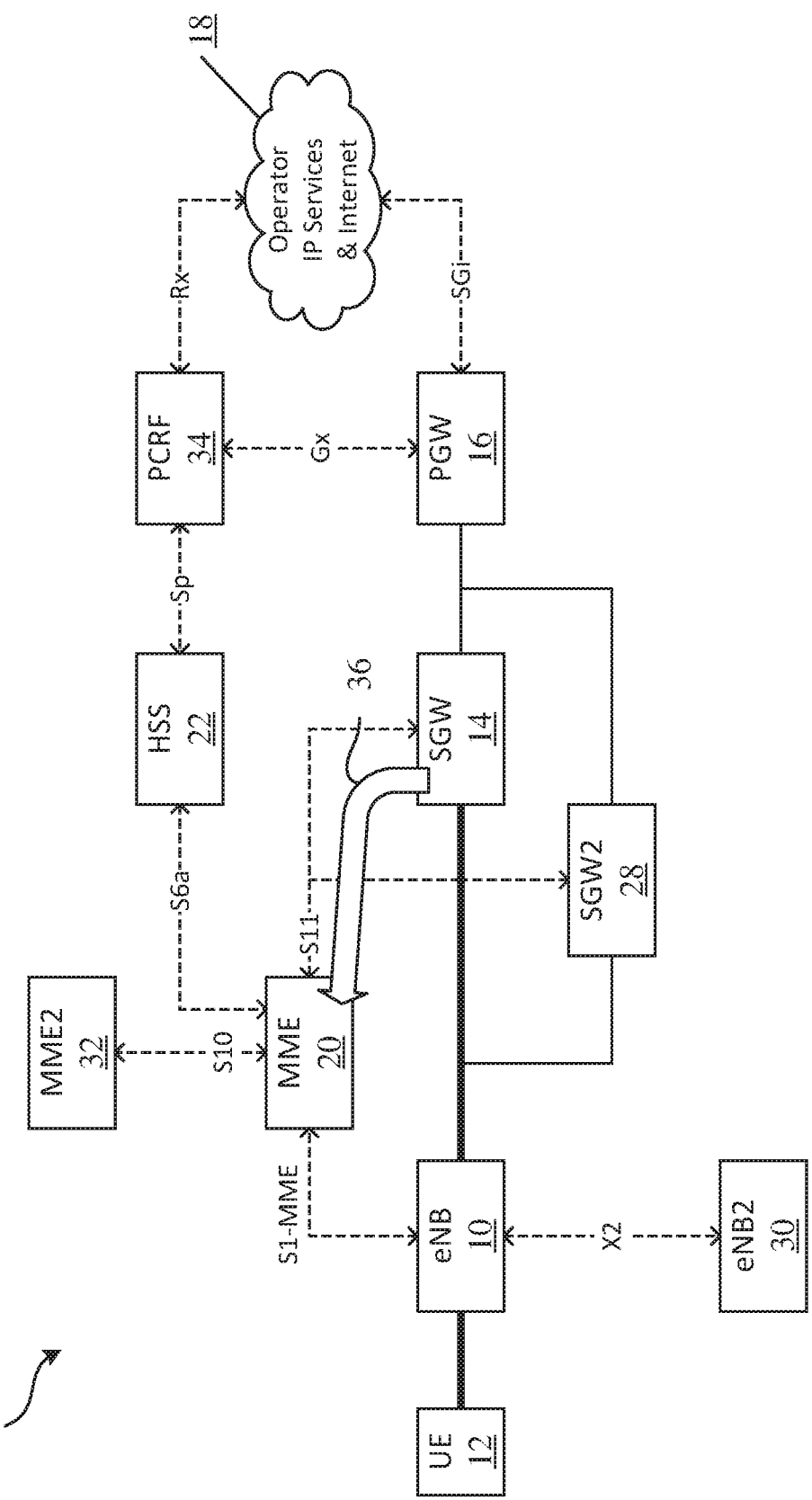
FIGS. 5A and 5B are block diagrams illustrating a system for security context escrowing according to an embodiment of the subject matter described herein.
Figure 5B:
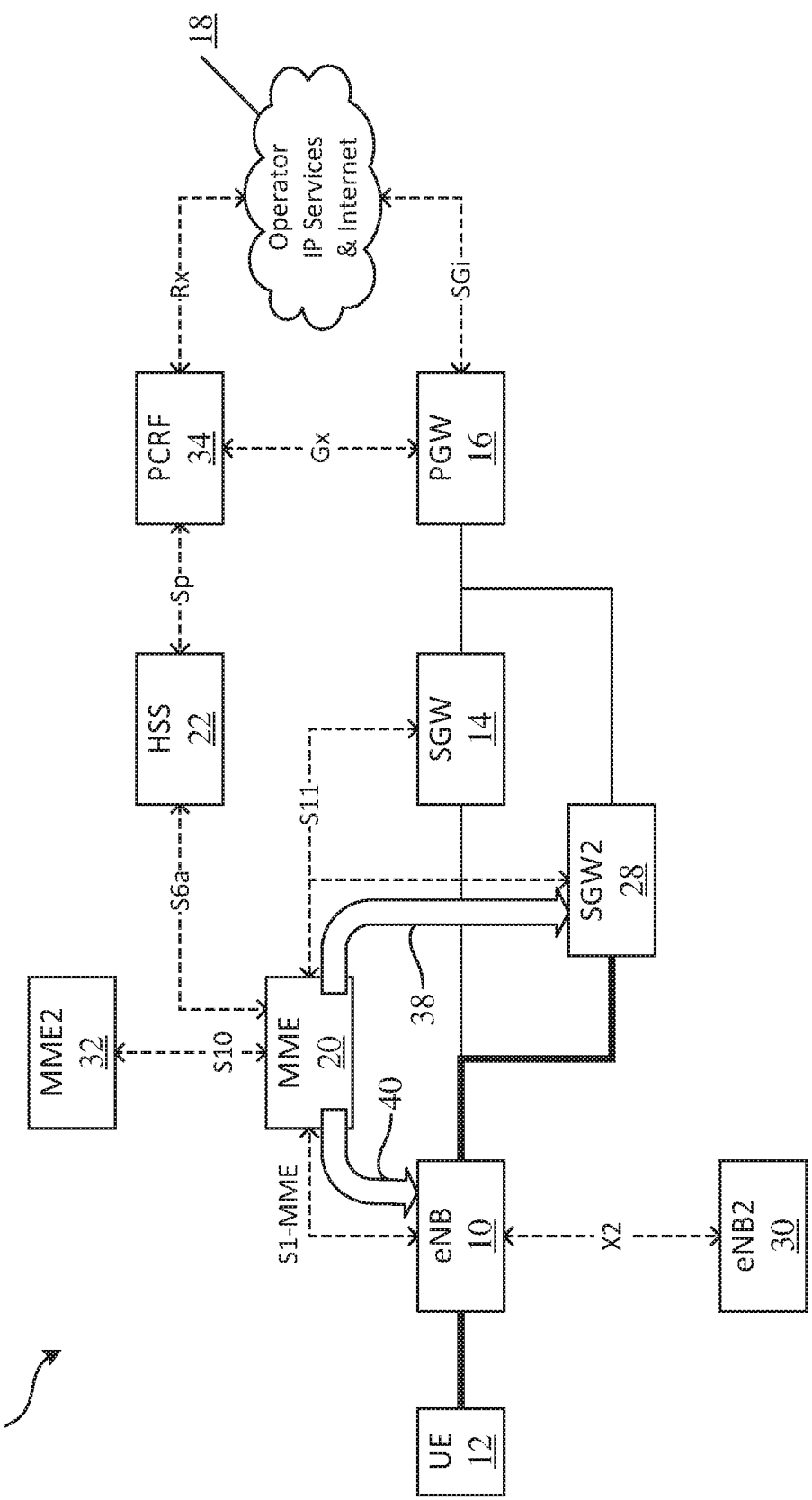

FIGS. 5A and 5B are block diagrams illustrating a system for security context escrowing and restoring according to an embodiment of the subject matter described herein. In the embodiment illustrated in FIGS. 5A and 5B, system 26 includes an Evolved Node B ("eNodeB" or "eNB") 10, a UE 12, a SGW 14, a Packet Gateway (PGW) 16, a Packet Data Network (PDN) 18, an MME 20, and an HSS 22, being essentially identical to their like-numbered counterparts illustrated in FIGS. 1 through 3 and therefore a description of which will not be repeated here.

In the embodiment illustrated in FIGS. 5A and 5B, the system 26 includes a second SGW (SGW2) 28, a second eNB (eNB2) 30, a second MME (MME2) 32, and a Policy and Charging Rules Function (PCRF) 34 for determining policy rules to be applied to the network. FIGS. 5A and 5B indicate the various protocols used to communicate between network entities, including: the X2 protocol between eNodeBs; the S1-MME protocol between an eNodeB and an MME; the S10 protocol between MMEs; the S11 protocol between an MME and a SGW; the S6a protocol between an MME and an HSS; the Sp protocol between an HSS and a PCRF; the Gx protocol between a PCRF and a PGW; the Rx protocol between a PCRF and other network entities; and the SGi protocol between a PGW and other network entities.

FIG. 5A illustrates security context escrowing according to an embodiment of the subject matter described herein. In the embodiment illustrated in FIG. 5A, the thick line connecting the UE 12 to the SGW 14 through the eNB 10 represents a SDFP connection between the UE 12 and the SGW 14. A security context is associated with the SDFP connection. Information that describes or is part of that security context is used by both the SGW 14 and the UE 12. An arrow 36 represents a security context escrow action in which a copy of the security context information for SDFP communication between the UE 12 and the SGW 14 is transferred from the SGW 14 to the MME 20, where it is stored or maintained. The security context information may be stored by or at the MME 20, or it may be ultimately stored at or by another network entity. In another embodiment, the security context may be sent from the SGW 14 to another network entity without going to or through an MME. It should be noted that the term "security context information" may refer to all of the information necessary to recreate the security context or to a subset thereof.

FIG. 5B illustrates security context restoring or transferring according to an embodiment of the subject matter described herein. In the embodiment illustrated in FIG. 5B, the SDFP connection between the SGW 14 is terminated, e.g., due to the SGW 14 being taken out of service for maintenance, due to the UE 12 moving to another location that is served instead by the SGW2 28, or other reasons (e.g., load sharing, load balancing, congestion control, and so on). For the purposes of illustration only, the first serving gateway SGW 14 will be referred to as the "donor" or "source" gateway, and the second serving gateway SGW2 28 will be referred to as the "receptor" or "target" gateway.

Rather than have the UE 12 engage in the re-authentication process with the receptor gateway SGW2 28, the security context information is transferred to SGW2 28. This action is represented by the arrow 38 from the MME 20 to the SGW2 28. In embodiments where the security context is stored at an entity other than the MME 20, the security context information would be transferred to the SGW2 28 from whichever entity stored that information. As a result of the security context restoration or transfer represented by the arrow 38, the SDFP connection from the UE 12 to the eNB 10 would remain in place and would extend from the eNB 10 to the receptor gateway SGW2 28. This is represented by the thick line connecting the UE 12 to the SGW2 28 through the eNB 10.

In one embodiment, in order for the eNB 10 to properly route the data to the receptor gateway SGW2 28, the MME 20 would need to notify the eNB 10 of the change. This is represented by the arrow 40 from the MME 20 to the eNB 10. For example, the SDFP connection to the donor gateway SGW 14 is associated with a bearerID, which the eNB 10 will have mapped to a connection to the donor gateway SGW 14. In one embodiment, the MME 20 would instruct the eNB 10 to remap the bearerID to a connection to the receptor gateway SGW2 28 instead. In this manner, the UE 12 would not need to make any change to the information associated with the SDFP connection stored by the UE 12. As a result, even though the SDFP connection was transferred from the donor gateway SGW 14 to the receptor gateway SGW2 28, nothing will have changed from the perspective of the UE 12.

Depending on the deployed alternative of the methods described herein, this security context updating can be configured: sporadically or on-demand (e.g., for group of UEs at SGW maintenance), periodically, systematically (e.g., at each UE small data transmission), etc. Each of these will now be described with reference to the system 26 illustrated in FIGS. 5A and 5B.

On-Demand Security Context Escrowing: this alternative is adapted, for instance, in operation maintenance use cases, where the donor SGW (e.g., the SGW 14) is relocated with a controlled detach from the Long Term Evolution (LTE) Evolved Packet Core (EPC). With explicit signaling to the MME 20, all existing security contexts are escrowed on the MME 20 before disabling the SGW 14. The receptor SGW (e.g., SGW2 28) restores the whole set of security contexts at initial setup. Any user plane data to transit during this procedure is buffered at eNB (uplink) or PGW (downlink)— General Packet Radio Service (GPRS) Tunneling Protocol (GTP) messages are in charge of notifying tunnel end point error—until the previously used tunnel end-point identifiers are set up by the MME 20 on the new eNB 10—SGW2 28 tunnel. This alternative can also be triggered periodically or at the activation of a temporal context (specific moments).

Systematic Security Context Escrowing: in this alternative, the donor SGW (e.g., SGW 14) escrows the UE security contexts with the MME 20 once the recovery key $K_{UPenc}$ is computed by the SGW 14 (e.g., at the UE 12 initial attach). For a given UE, the MME 20 updates the escrowed variable elements of the security context, such as the "count" variable, when the UE 12 changes the connection state to idle (e.g., FIG. 5A). If the SGW 14 is relocated for the UE 12 as a result of mobility, the SGW2 28 restores only the security context for the UE 12 from the MME 20 (e.g., FIG. 5B). The MME also signals the eNB 10 to map the same bearerID to the new SGW2 tunnel end-point ID, so that the UE 12 would not need to make any change to the bearerID or other information associated with the SDFP connection stored by the UE 12—i.e., the transition is transparent to the UE 12.

Real-time Security Context Escrowing: in this alternative, the donor gateway (e.g., the SGW 14) escrows the UE 12 security contexts with the MME 10 once the recovery key $K_{UPenc}$ is computed by the SGW 14 (e.g., at the UE 12 initial attach) as with the previous alternative. Then, for all the UEs anchored to the SGW 14, there is one communication channel set up and maintained with the MME 20 so that security contexts updates by the SGW 14 are escrowed on the MME 20 in real time, at each PDCP Packet Data Unit (PDU) small data transmission. In one embodiment, only the variable elements of the security context are transmitted. This alternative is adapted to critical applications, with more service continuity requirements. With this approach, the SGW 14 could be relocated while the UEs 12 are still in connected state.

Figure 6:
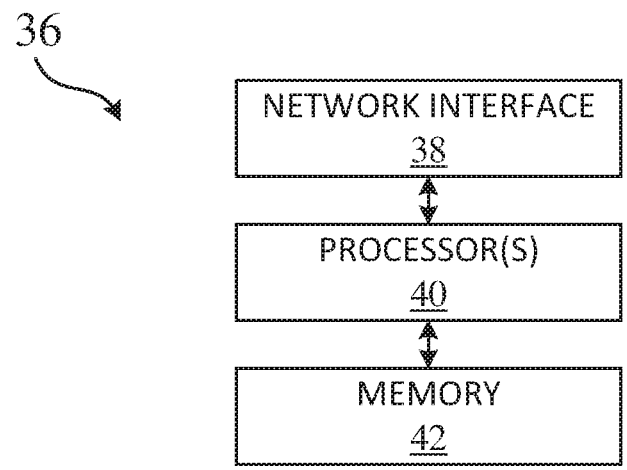
FIG. 6 is a block diagram illustrating an exemplary network node for a telecommunications network according to an embodiment of the subject matter described herein.
Figure 7:
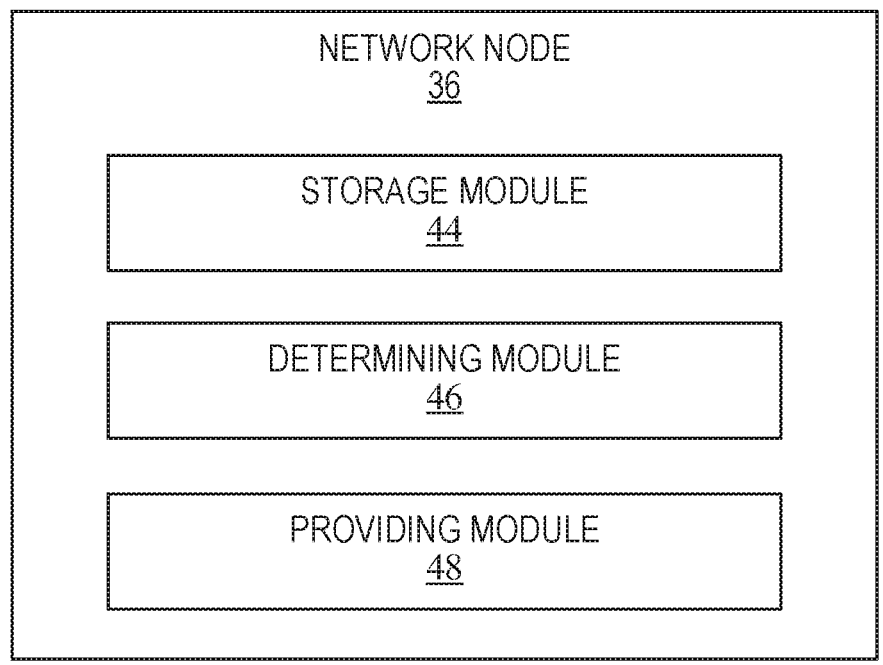
FIG. 7 is a block diagram illustrating an exemplary node for a telecommunications network according to an embodiment of the subject matter described herein.

FIG. 6 is a block diagram illustrating an exemplary network node for a telecommunications network according to an embodiment of the subject matter described herein. In the embodiment illustrated in FIG. 6, the network node 36 comprises a network interface 38 for communicating with a telecommunications network, one or more processors 40, and memory 42 for storing instructions executable by the one or more processors 40. The network node 36 is operable to store information associated with a security context between a wireless device and a first gateway that is serving the wireless device, to determine a change in the gateway that is serving the wireless device from the first gateway to a second gateway, and to provide, in response to determining the change, the stored security context to the second gateway for use with the wireless device. In one embodiment, the network node comprises an MME 20. FIG. 7 is a block diagram illustrating an exemplary node for a telecommunications network according to an embodiment of the subject matter described herein. In the embodiment illustrated in FIG. 7, the network node 36 includes a: storage module 44 operable to store security context information associated with a small data, fast path connection between a wireless device and a first gateway that is serving the wireless device; a determining module (46) operable to determine a change in the gateway that is serving the wireless device from the first gateway to a second gateway; and a providing module (48) operable to provide, in response to determining the change, the stored security context information to the second gateway for use with the wireless device.

The following acronyms are used throughout this disclosure.

3GPP Third Generation Partnership Project
AES Advanced Encryption Standard
ASIC Application Specific Integrated Circuit
CPU Central Processing Unit
DRB Data Radio Bearer
DRF Data Recovery Field
DRK Data Recovery Key
EIR Equipment Identity Register
eNB Evolved Node B
EPC Evolved Packet Core
FP Frame Protocol
FPGA Field Programmable Gate Array
F-TEID Fully qualified Tunnel Endpoint Identifier
GPRS General Packet Radio Service
GTP-U GPRS Tunneling Protocol—User plane
HSS Home Subscriber Server
IMEI International Mobile Equipment Identity
IMSI International Mobile Subscriber Identity
IoT Internet of Things
IP Internet Protocol
$K_{UPenc}$ User plane encryption key
$K_{stream}$ Data stream encryption key
LTE Long Term Evolution
M2M Machine To Machine
MME Mobility Management Entity
MTC Machine Type Communication
NAS Non-Access Stratum
PCRF Policy and Charging Rules Function
PDCP Packet Data Convergence Protocol
PDF Packet Data Unit
PDN Packet Data Network
PDU Packet Data Unit
PGW Packet Gateway
RAN Radio Access Network
ROHC Robust Header Compression
$K_{UPenc}$
$K_{stream}$
RRC Radio Resource Control
SAE System Architecture Evolution
SDFP Small Data, Fast Path
SGW Serving Gateway
S-TMSI SAE Temporary Mobile Subscriber Identity
TMSI Temporary Mobile Subscriber Identity
UE User Equipment
WiFi Wireless Fidelity Those skilled in the art will recognize improvements and modifications to the embodiments of the present disclosure. All such improvements and modifications are considered within the scope of the concepts disclosed herein and the claims that follow.

What is claimed is:

1. A method of operation of a network node for a telecommunications network, the method comprising: storing security context information comprising at least one of a user plane encryption key, $Ku_{pen}c$, and information identifying an encryption algorithm, the security context information associated with a small data, fast path connection between a wireless device and a first gateway through a base station that is serving the wireless device; determining a change in the gateway that is serving the wireless device from the first gateway to a second gateway; and providing, in response to determining the change, the stored security context information to the second gateway for use with the wireless device; wherein, in response to determining the change, the network node instructs the base station to remap information used by the base station to identify the first gateway to instead identify the second gateway.

2. The method of claim 1 wherein the network node comprises a Mobility Management Entity, MME.

3. The method of claim 1 wherein the security context information includes further information comprising at least one of:
   information indicating a direction of transmission;
   information identifying a bearer;
   information indicating a transmission size; and
   information indicating a transmission count.

4. The method of claim 1 wherein, prior to the change, the security context information is associated with a first tunnel from the wireless device to the first gateway via the base station and wherein, subsequent to the change, the security context information is associated with a second tunnel from the wireless device to the second gateway via the base station.

5. The method of claim 1 wherein the base station comprises an evolved node B.

6. The method of claim 1 wherein the information used to identify the first gateway comprises a gateway bearer resource identifier.

7. The method of claim 1 further comprising:
   receiving, from a sender, an update for at least some of the security context information; and
   using the received security context information to update the security context information stored at the network node,
   wherein the sender comprises at least one of the first gateway or the second gateway.

8. The method of claim 7 wherein receiving the update comprises receiving at least one of:
   a user plane encryption key, $K_{UPenc}$;
   information indicating a direction of transmission;
   information identifying a bearer;
   information indicating a transmission size;
   information indicating a transmission count; and
   information identifying an encryption algorithm.

9. The method of claim 7 wherein the update is received in response to a triggering event.

10. The method of claim 9 wherein the triggering event comprises receiving, by the sender, a command to provide the update.

11. The method of claim 10 wherein the command was sent by the network node.

12. The method of claim 9 wherein the triggering event comprises computation of the user plane encryption key, $K_{UPenc}$, by the sender.

13. The method of claim 9 wherein the triggering event comprises a change of the sender's connection state.

14. The method of claim 9 wherein the triggering event comprises a change of at least a portion of the security context information.

15. The method of claim 9 wherein the triggering event comprises expiry of a timer or passage of a defined duration of time.

16. The method of claim 9 wherein the triggering event comprises completion of transmission of data to or from the sender.

17. A network node for a telecommunications network, the network node comprising: a network interface for communicating with the telecommunications network; one or more processors; and memory storing instructions executable by the one or more processors, whereby the network node is operable to: store information associated with a security context between a wireless device and a first gateway through a base station that is serving the wireless device, the information associated with the security context comprising at least one of a user pane encryption key, $Ku_{pen}c$, and information identifying an encryption algorithm; determine a change in the gateway that is serving the wireless device from the first gateway to a second gateway; and provide, in response to determining the change, the stored security context to the second gateway for use with the wireless device;

wherein, in response to determining the change, the network node instructs the base station to remap information used by the base station to identify the first gateway to instead identify the second gateway.

18. A non-transitory computer readable medium storing software instructions that when executed by one or more processors of a network node for a telecommunications network, cause the network node to: store information associated with a security context between a wireless device and a first gateway through a base station that is serving the wireless device; determine a change in the gateway that is serving the wireless device from the first gateway to a second gateway; and provide, in response to determining the change, the stored security context to the second gateway for use with the wireless device;

wherein, in response to determining the change, the network node instructs the base station to remap information used by the base station to identify the first gateway to instead identify the second gateway.

* * * * *